United States Patent Office 3,524,734
Patented Aug. 18, 1970

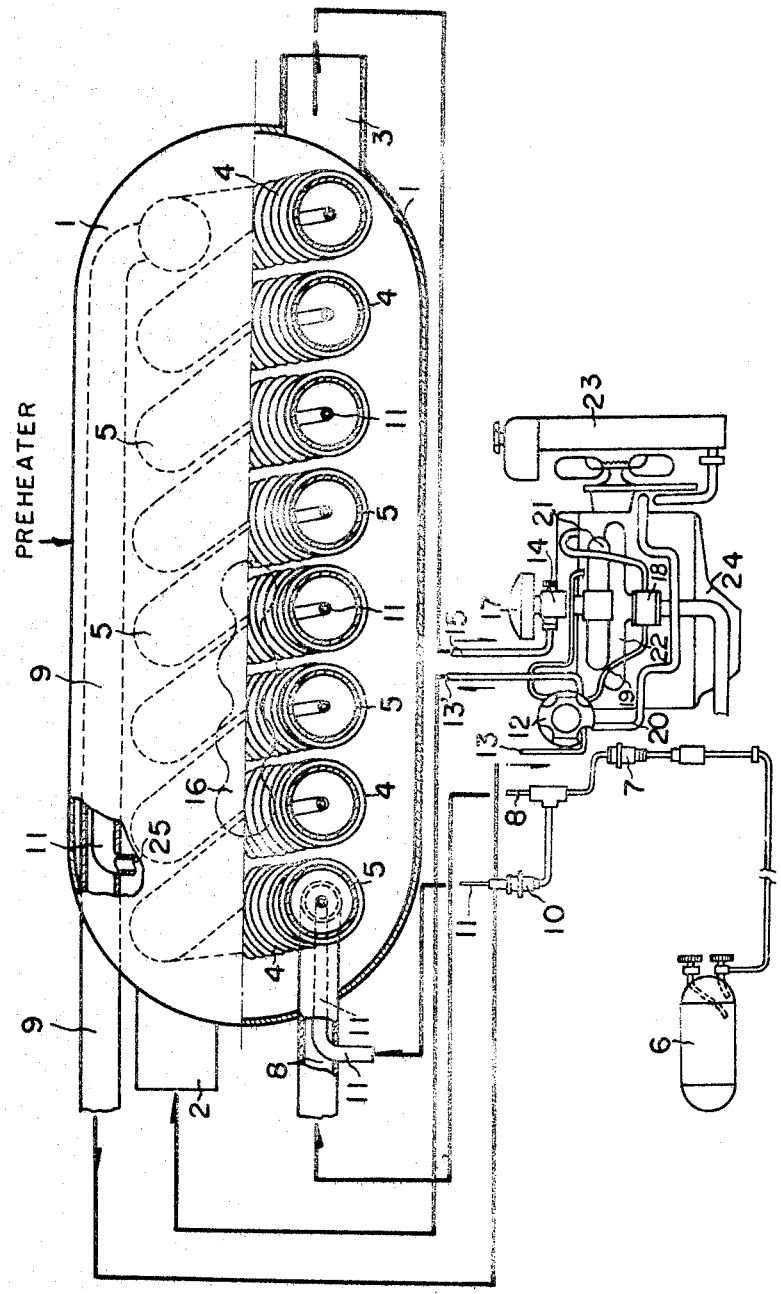

3,524,734
DEVICE FOR PROMOTING PERFECT COMBUSTION OF LIQUEFIED PETROLEUM GAS FOR USE IN CARS
Soko Kamiryo, 578 1-chome, Hikari-machi, Kokubunji-shi, Tokyo-to, Japan, and Tsunesuke Kubo, 20 Idogaya-Nakamachi, Kanagawa-ken, Yokohama-shi, Japan
Filed Oct. 31, 1967, Ser. No. 679,348
Int. Cl. B01f *3/02, 3/04;* F02m *21/06*
U.S. Cl. 48—180                                           4 Claims

ABSTRACT OF THE DISCLOSURE

A liquefied petroleum gas combustion device particularly for cars comprising a preheater and a plurality of spiral pipes fitted therein. Each spiral contains a plurality of radiation fins on the external surface thereof. A liquefied petroleum gas tank and a vaporizer are provided. The spiral pipes communicate with the liquefied petroleum gas tank and the vaporizer to form a continuous liquefied petroleum gas flow circuit starting from the gas tank passing through the insides of the spiral pipes in the preheater, the vaporizer and the external surfaces of the spiral pipes, in that order, respectively. A gas mixer is provided which receives the gas from the vaporizer and means for vaporizing, condensing and mixing air in the flow circuit between the gas tank and the gas mixer as the liquefied petroleum gas flows therethrough.

---

The present invention relates to a device for promoting the perfect combustion of LP gas (i.e., liquefied petroleum gas), used in cars.

It is an object of the present invention to enhance the output of engines by providing a device for the perfect combustion of LP gas, as well as to prevent the generation of air pollution and other public nuisances caused by toxic exhaust gas.

In a conventional car engine using liquefied petroleum (LP) gas, gas from the gas bomb is delievered into the vaporizer, from which the gas is further guided through a gas mixer into the engine cylinder.

However, as well known, LP gas has a large expansion co-efficient, a large volume and is low in density, so that sufficient feeding and compression of gas within the cylinder can hardly be attained. In general, a perfect mixing of LP gas with air at the time of combustion requires a large amount of air, not like the case of gasoline. But according to the above-mentioned conventional method, it is almost impossible to obtain a proper mixing proportion with the air, causing as an inevitable result, an imperfect combustion. This not only results in the reduction of the output of the engine and an increase in the amount of gas consumed, but also produces and releases toxic exhaust gases containing numerous, unburnt particles. Thus, in addition to being extremely unsanitary, the conventional devices using LP gas have many other defects and disadvantages.

With a view to avoiding these defects and disadvantages, the present inventors have carried on extensive studies on how to turn LP gas, having a high expansion coefficient, into a uniform and dense condition and how to mix such gas with the air within the gas mixer at an optimum mixing proportion so that, by supplying such mixture into the cylinder, a perfect combustion may be attained. They have at last arrived at the present invention whereby the intended objects can be completely accomplished.

It is an object of the present invention, to reduce the volume of the vaporized LP gas as much as possible and to supply it at a maximum density to the engine cylinder, by providing a preheater between the LP gas tank and the vaporizer, the preheater having a spiral pipe mounted therein, the latter having a number of radiation fins on the external surface thereof, whereby a continuous LP gas flow circuit is formed starting from the LP gas tank, passing through the inside portions of the spiral pipe in the preheater, the vaporizer and the external surface of the spiral pipe, and finally reaching the gas mixer. During this course, gas evaporation, reduction of the gas volume and appropriate air mixing are conducted.

With this and other objects in view which will become apparent in the following detailed description, the present invention will be clearly understood in connection with the accompanying showing of the principal preheater section, part of which is shown in axial section.

Referring now to the drawing, a preheater comprising a hollow cylinder which constitutes the principal part of the present invention has mounted therein a single spiral pipe 5 having a number of radiation fins 4 on the external surface thereof along the longitudinal axis of the hollow cylinder 1, the latter having at both ends thereof, respectively, an inlet conduit 2, and an outlet conduit 3. One end of the preheater is connected to a feedpipe 8 and a discharge pipe 9 both protruding outside the hollow cylinder. The spiral pipe 5 has a thin pipe 11 arranged therein along the full length thereof, one end of the thin pipe 11 being led outside the hollow cylinder while the other end extends from the terminal end of the spiral pipe to form a nozzle protruding in the hollow cylinder.

Thus, in the preheater, the gas feed pipe 8 is connected to the LP gas tank 6 through a first valve 7, while the thin pipe 11 is also connected to the LP gas tank 6 through a second valve 10. It will also be seen that the gas discharge pipe 9 is connected to an inflow port 13 of a vaporizer 12 in the engine mechanism, while the outflow port 13' of the vaporizer is connected to the inlet conduit 2 of the hollow cylinder 1. Further, the outlet conduct 3 of the hollow cylinder 1 is connected to the gas mixer 14, thereby completing the desired LP gas flow-circuit.

A uniform gas distributing plate 16 is serving to smooth the gas stream mounted on the central axial line in the spiral pipe 5. An air cleaner 17, a hot water heater 18, and a hot water pipe 19 connecting the heater to the vaporizer 12 are provided. A hot water return pipe 20, an intake-manifold 21, an exhaust-manifold 22, a radiator 23, and a crank case 24 are also provided, all of which parts, except the gas distributing plate, are already known and adopted in the conventional engine mechanism.

When starting the engine, first an electromagnetic valve (not shown) is energized to open the first valve 7, permitting LP gas in the gas tank 6 to flow into the feed pipe 8 into the spiral pipe 5 where it gyrates and moves on through the discharge pipe 9 into the vaporizer 12 where it is vaporized and again enters through the inlet conduit 2 into the hollow cylinder in which it is contacted with the entire faces of the radiation fins 4 of the spiral pipe 5. In this case, since the engine is not yet sufficiently heated, the vaporized LP gas enters the gas mixer 14 from the outlet 3 while keeping merely an adiabatically expanded condition, so that its volume remains comparatively reduced, producing therefore no adverse effect on the mixing rate with the air.

Then, at about the time when the engine begins a normal operation, an electromagnetic valve (not shown) is energized to open the second valve 10, LP gas in the gas tank 6 now also flows through the thin pipe 11. The gas then jets through the nozzle 25 onto the peripheral face of the spiral pipe 5 in the hollow cylinder 1. This gas is vaporized in the inside of the hollow cylinder and is then supplied through the outlet conduit 3 directly into the gas mixer 14. Since the heat insulated cold LP gas being vaporized always flows in the spiral pipe 5, the radiation fins 4 are kept at an extremely low temperature by evaporation heat, so that the LP gas stream released into the hollow cylinder, which passes through the hollow cylinder while contacting the radiation fins, is cooled and extremely reduced in gas volume by the time it reaches the outlet conduit 3. Thus the gas volume is reduced to a minimum. This permits a large amount of gas to be fed in the gas mixer 14 through the feed pipe 15. Further, the fed gas, before entering the vaporizer 12 in the course of heat exchange, continuously absorbs heat in the gas in the hollow cylinder, thus heating itself with the absorbed heat, and enters the vaporizer in an easily vaporizable condition. Accordingly there is produced a gas of uniform density which is then effectively compressed along with a sufficient amount of air in the cylinder, whereby combustion efficiency is enhanced to realize desired perfect combustion. Thus the present invention not only contributes to the enhancement of engine performance and a sharp reduction in the cost of fuel, but also prevents any chance for production and release into the atmosphere of any toxic exhaust gas, since LP gas, reduced in gas volume to a minimum by circulation between the hollow cylinder 1 and the vaporizer 12, is mixed with the air in an appropriate proportion in the gas mixer 14 and the entire formed mixture is delivered into the cylinder. The exhaust gas, ultimately exhausted out of the engine, is an odorless, innoxious gas. Thus the present invention can perfectly prevent any public nuisance which may be caused by toxic exhaust gas released from cars.

The present inventors have conducted repeated running tests by installing the present device on a 1900 cc. medium sized car and measuring the amount of toxic exhaust gas. As a result, it was found that, with respect to toxic exhaust gas, the tested car, not installed with the present device, produced exhaust gas of 2.5% at 600 r.p.m. and 1.5% at 2000 r.p.m. when measured in an idling condition, but the same car when installed with the device of the present invention produced no such toxic exhaust gas. In the fuel tests (running mileage 25,000 km., period 18 days, average running mileage per day 300 km.), it was found that the average mileage per litre of the car not installed with the present device was 5.25 km., while that of the car installed with the device of the present invention was 6.38 km., which is an increase of about 22%.

Other excellent test results obtained include elimination of the stench of LP gas and an improvement in accelerating performance. It is expected that cars using LP gas, such as freight trucks, will notably increase in the future, so that the device of the present invention if mounted on these cars can not only serve to prevent public nuisances but also will prove advantageous for the industries involved with respect to fuel economization.

While we have disclosed one embodiment of the present invention, it is to be understood that this embodiment is given by example only and not in a limiting sense.

We claim:
1. A device for promoting perfect combustion of LP gas used in cars, comprising
a preheater,
an LP gas tank,
a vaporizer,
a gas mixer including means for supplying and mixing air with gas,
a spiral pipe disposed in said preheater,
a plurality of radiation fins on the external surface of said spiral pipe,
first and second conduit means communicating said spiral pipe with and between said LP gas tank and said vaporizer, respectively, and third conduit means for passing the gas from said vaporizer into said preheater adjacent the external surface of said spiral pipe, and fourth conduit means for passing the gas from said preheater into said gas mixer, thereby constituting a continuous LP gas flow circuit starting from said LP gas tank, passing through the inside of said spiral pipe in said preheater, said vaporizer and in said preheater adjacent the external surface of said spiral pipe, in that order and terminating in said gas mixer, during which courses of flow the gas is vaporized, reduced in gas volume and mixed with air.

2. The device for promoting perfect combustion of LP gas used in cars, as set forth in claim 1, wherein
said preheater comprises a hollow cylinder having an inlet and an outlet, respectively, at the ends thereof, in communication with said third conduit means and said fourth conduit means, respectively,
said spiral pipe disposed in said hollow cylinder along the longitudinal axis thereof,
said first conduit means and said second conduit means comprising a feed pipe and a discharge pipe, respectively, both connected to and extending outside of said hollow cylinder in communication with the interior of said spiral pipe,
a thin pipe disposed in the inside of said spiral pipe along the full length thereof,
one end of said thin pipe being led out of said spiral pipe and out of said hollow cylinder adjacent said feed pipe,
the other end of said thin pipe extends from an end of said spiral pipe, and
a nozzle formed at said other end of said thin pipe projecting into said hollow cylinder in communication with the interior of said hollow cylinder adjacent said external surface of said spiral pipe.

3. The device, as set forth in claim 2, further comprising
a gas distributing plate disposed in said hollow cylinder along the axis of said spiral pipe thereby smoothing out the gas stream in said hollow cylinder.

4. The device, as set forth in claim 2, wherein
said nozzle is positioned adjacent said inlet of said hollow cylinder,
fifth conduit means communicating said thin pipe through said one end with said LP gas tank, and
first valve means and second valve means for controlling the flow of LP gas from said LP gas neck through said feed pipe and said fifth conduit means, respectively.

References Cited

UNITED STATES PATENTS

| | | | |
|---|---|---|---|
| 2,023,809 | 12/1935 | Heller | 48—184 |
| 2,240,846 | 5/1941 | Hanson. | |
| 2,745,727 | 5/1956 | Holzapfel | 123—120 X |
| 2,821,843 | 2/1958 | Mengelkamp et al. | 123—120 X |
| 2,896,658 | 7/1959 | Jones | 123—120 X |

JOSEPH SCOVRONEK, Primary Examiner

U.S. Cl. X.R.

48—93, 102; 62—52; 123—120, 122; 165—163; 261—144, 158